Figure 3:
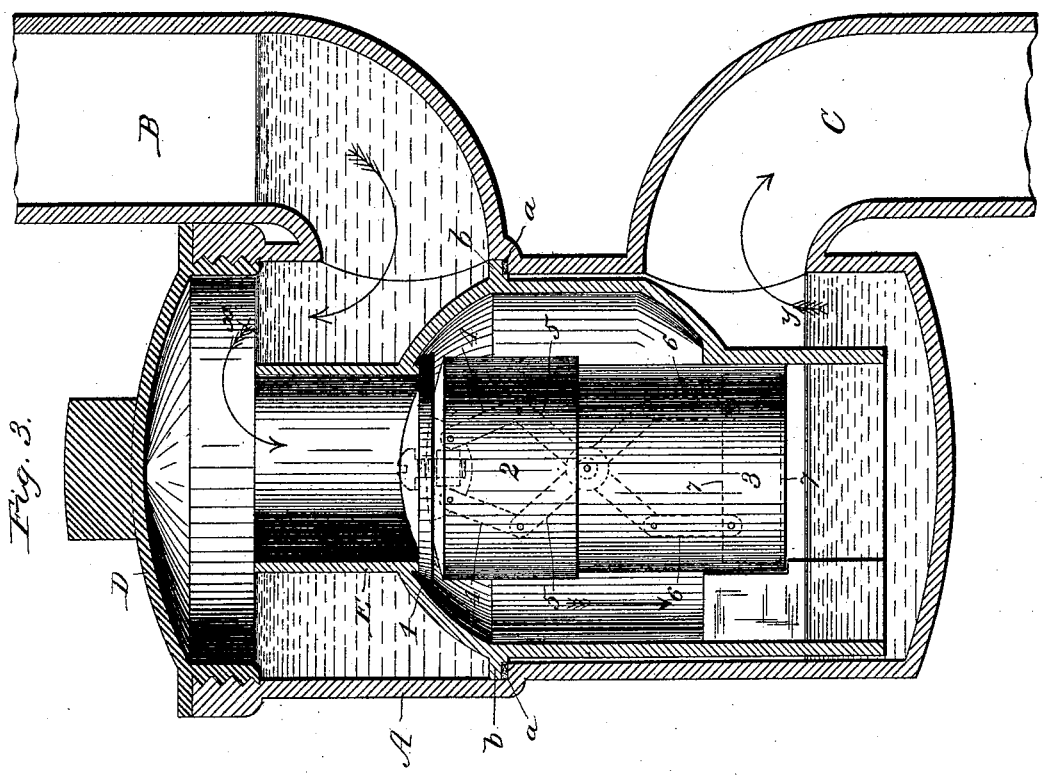

(No Model.) 2 Sheets—Sheet 1.
T. SHEHAN.
SEWER GAS AND STENCH TRAP.
No. 340,255. Patented Apr. 20, 1886.
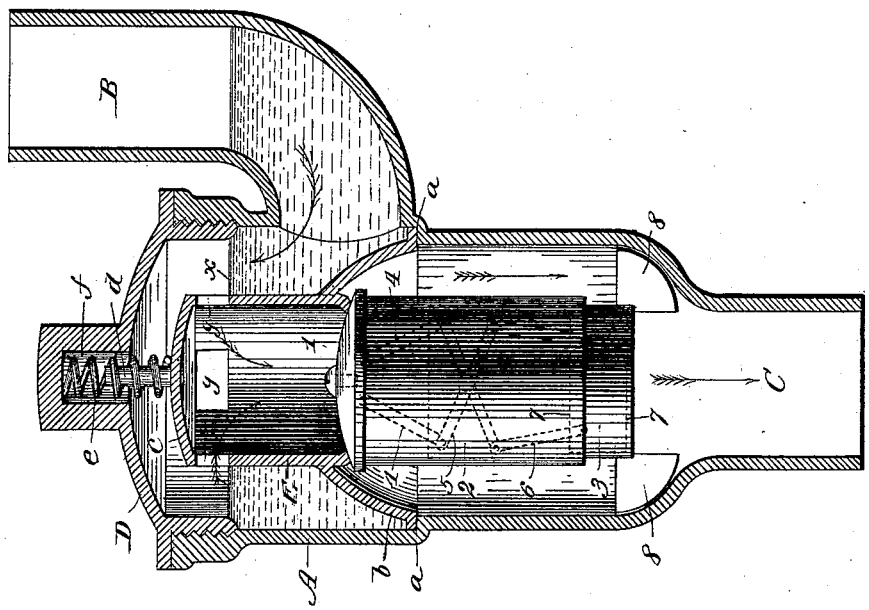
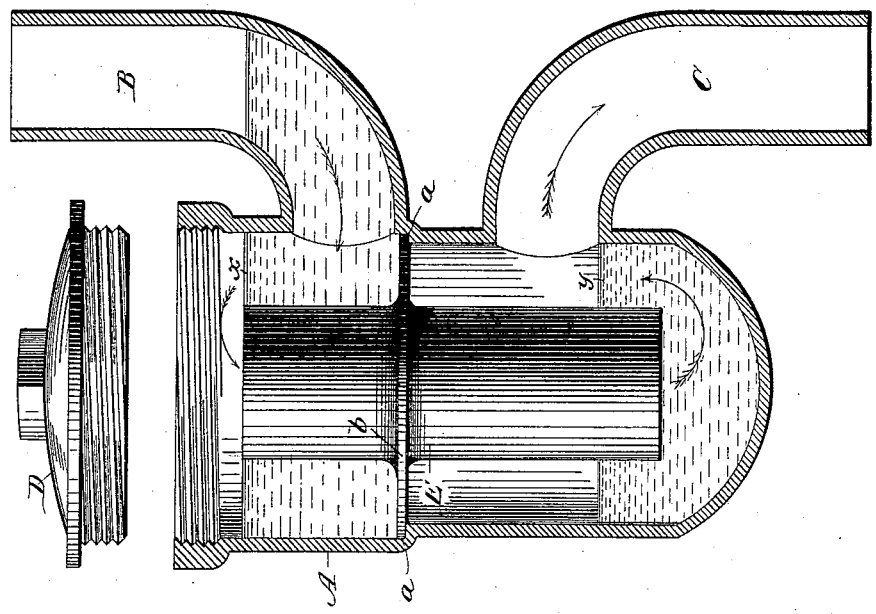
Witnesses:
N. N. Low
E. F. Dick
Inventor:
Thomas Shehan
by McMullen Bailey
his attorney (No Model.) 2 Sheets—Sheet 2.

T. SHEHAN.
SEWER GAS AND STENCH TRAP.

No. 340,255. Patented Apr. 20, 1886.

Witnesses:
H. N. Low
E. H. Dick

Inventor:
Thomas Shehan
by Macullen Driller
his attorney

UNITED STATES PATENT OFFICE.

THOMAS SHEHAN, OF CLEVELAND, OHIO.

SEWER-GAS AND STENCH TRAP.

SPECIFICATION forming part of Letters Patent No. 340,255, dated April 20, 1886.

Application filed March 10, 1886. Serial No. 194,703. (No model.)

*To all whom it may concern:*

Be it known that I, THOMAS SHEHAN, of Cleveland, in the State of Ohio, have invented certain new and useful Improvements in Sewer-Gas and Stench Traps, of which the following is a specification.

The trap in which my invention is comprised is characterized by the combination, with the trap-body, of a removable internal section so formed as to hold a water-seal within the body of the trap at a point intermediate between the inlet and outlet openings of the trap. This removable section makes a water-tight joint with the body of the trap at a point intermediate between the inlet and outlet openings or pipes, and is so formed and arranged that all the matter passing from the inlet to the outlet pipe must pass through it also. The body itself is provided with an opening closed by a removable cap, said opening being so located that access through it can readily be had to the removable section.

The device is designed more particularly for use in connection with the valve mechanism for which Letters Patent No. 335,967 were issued to me on the 9th of February, 1886, and the main object which I have in view in the invention (aside from preventing more effectually any possible back-flow of gases or noxious odors) is to have an internal trap section that can readily be removed in case of stopping up of the outlet-pipe, and, in fine, to obtain a trap all the parts of which can readily be got at whenever desired.

The nature of my invention will be readily understood by reference to the accompanying drawings, in which Figure 1 is a vertical central section of a trap embodying the invention in one of its forms. Fig. 2 is a like section of a trap embodying the improvement in connection with my patented valve mechanism hereinbefore referred to. Fig. 3 is a like section of a trap similar in general organization to the trap shown in the last preceding figure, save that the latter has but one water-seal, which is above the water-tight joint connecting the removable section to the shell or body of the trap, whereas in Fig. 3 there are two water-seals, one above and one below said water-tight joint.

A is the body or shell of the trap.
C is the outlet-pipe.
B is the inlet-pipe.
D is the external removable cap closing the opening in the trap shell or body, through which access is had to the interior thereof, and through which also the removable section, as well as the other internal working parts, can be removed and replaced.

E is the removable section, located within the body of the trap, and making a water-tight joint, *a*, with said trap body at a point intermediate between the inlet and outlet pipes.

In Fig. 1 the removable section E has the form of a tube provided at the proper point with an external imperforate flange or diaphragm, *b*, which is supported by and makes a water-tight joint with the trap-body A. The inlet and outlet pipes open into the side of the trap at points below the top and above the bottom thereof, respectively, and the tube or section E extends at the top above the inlet-opening and at the bottom below the outlet-opening, so that both above and below the diaphragm *b* the trap will hold a water-seal, as indicated by dotted lines $x$ and $y$.

It is manifest that, in lieu of the two water-seals, the removable sections can be so formed as to hold but one water-seal—that is to say, I can dispense either with that portion of the tube E above the diaphragm, and thus leave only the outlet water-seal, or with that portion of said tube below the diaphragm, and thus leave only the inlet water-seal. The latter arrangement is shown in Fig. 2. In this arrangement the tube E has a downwardly-inclined diaphragm or flange, *b*, (used to raise the tube high enough to permit my valve mechanism to be put below it,) which makes the water-tight joint with the trap-body at *a*. The tube is also closed at the top, being there provided with a head, *c*, provided with a central guide-stem, *d*, encircled by a spiral spring, *e*, of suitable strength, which enters a socket, *f*, in the external cap, D, and is confined between the said cap and the head *c*, the function of said spring being to hold the tube or removable section E down tightly in place. In the tube are formed openings *g* for the passage of water from the inlet to the outlet pipes, these openings being at a point above the inlet-opening, so as to hold a water seal. There being no water-seal at the outlet, the outlet-pipe C can lead from the bottom of the trap, as shown, instead of from the side. The bottom of the tube E is open, and is formed as a valve-seat, to receive the counterbalanced valve 1, carried by the sliding sleeve 2, which is mounted on the stationary barrel 3, and is connected by links 4 to pivoted rocking arms 5, from the lower ends of which hang links 6, connected to a weight, 7. The barrel 3 is provided with external wings, 8, by which it is supported in place in the trap.

The valve mechanism is similar to that described in my Letters Patent No. 335,967, hereinbefore referred to, and requires no further explanation.

In Fig. 3 the organization is in a general way similar to that already described by reference to Fig. 2, the difference being that the spring arrangement for holding down the section is dispensed with, and that the section itself is so formed as to extend both above and below the flange or diaphragm $b$ far enough to hold both an inlet and an outlet water-seal.

It is manifest that that portion of the tube or section in Fig. 3 above the diaphragm $b$ can be so shortened as not to hold a water-seal, in which event the water seal would be held at the outlet-opening only.

I do not restrict myself to the use in connection with the removable section E of the particular valve mechanism described, although I prefer to employ it.

What I claim herein as new and of my own invention is—

1. The combination of the trap-body, the inlet and outlet pipes, and the removable tubular section making a water-tight joint with the trap-body at a point between the inlet and outlet pipes, and extended both above and below said joint far enough with reference to the inlet and outlet openings to hold a water-seal at each of its ends, substantially as and for the purposes hereinbefore set forth.

2. The combination of the trap-body, the inlet and outlet pipes, the removable tubular section making a water-tight joint with the trap-body at a point between the inlet and outlet pipes, and arranged, substantially as described, to hold a water-seal in the trap, and a counterbalanced valve controlling the water-passage in said tubular section, substantially as and for the purposes hereinbefore set forth.

In testimony whereof I have hereunto set my hand this 6th day of March, 1886.

THOMAS SHEHAN.

Witnesses:
J. E. FARRELL,
J. T. BRADY.